US008437346B2

(12) United States Patent
Horne

(10) Patent No.: US 8,437,346 B2
(45) Date of Patent: *May 7, 2013

(54) IP SERVICE NODE FOR DIRECT P2P MEDIA FLOWS WITH NAT TRAVERSAL

(76) Inventor: Simon John Horne, Singapore (SG)

( * ) Notice: Subject to any disclaimer, the term of this patent is extended or adjusted under 35 U.S.C. 154(b) by 333 days.

This patent is subject to a terminal disclaimer.

(21) Appl. No.: 12/872,181

(22) Filed: Aug. 31, 2010

(65) Prior Publication Data

US 2010/0325311 A1 Dec. 23, 2010

Related U.S. Application Data

(63) Continuation of application No. 11/765,168, filed on Jun. 19, 2007, now Pat. No. 7,804,830.

(51) Int. Cl.
*H04L 12/56* (2006.01)
(52) U.S. Cl.
USPC ............................ 370/389; 370/401; 370/235
(58) Field of Classification Search .................. 370/401, 370/235, 238, 386
See application file for complete search history.

(56) References Cited

U.S. PATENT DOCUMENTS

| 4,692,918 A | 9/1987 | Elliot et al. |
| 5,018,133 A | 5/1991 | Tsukakoshi et al. |
| 5,371,852 A | 12/1994 | Attanasio et al. |
| 6,650,621 B1 | 11/2003 | Maki-Kullas |
| 7,219,161 B1 | 5/2007 | Fagundo et al. |
| 7,804,830 B2 * | 9/2010 | Horne ........................... 370/389 |
| 2004/0139228 A1 | 7/2004 | Takeda et al. |
| 2006/0182100 A1 | 8/2006 | Li et al. |
| 2008/0080532 A1 | 4/2008 | O'Sullivan et al. |

OTHER PUBLICATIONS

Rosenberg et al., "STUN—Simple Transversal of User Datagram Protocol (UDP) Through Network Address Translators (NATS)," Network Working Group, Request for Comments 3489, CISCO, Mar. 2003.

* cited by examiner

*Primary Examiner* — Dang Ton
*Assistant Examiner* — Pamit Kaur
(74) *Attorney, Agent, or Firm* — Stolowitz Ford Cowger LLP

(57) ABSTRACT

An IP network service node is disclosed for establishing direct IP bi-directional or unidirectional connectivity between communication devices (6,24), accommodating the circumstance of either or both communication devices residing behind a Network Address Translator (NAT). When a communication device requests IP connectivity to another communication device, either the local or remote communication device's associated service node (26,28) or their agents (41,42) (or another node 29, using information collected by the devices' associated service nodes), formulates an appropriate direct IP pathway (40) to traverse any pertinent NATs and instructs the applicable communication devices (30,32, 34,44,45,46,47) to self-configure to establish the pathway (40).

7 Claims, 6 Drawing Sheets

IP SERVICE NODE FOR DIRECT P2P MEDIA FLOWS WITH NAT TRAVERSAL

CROSS REFERENCE TO RELATED APPLICATIONS

This application is a continuation of U.S. patent application Ser. No. 11/765,168, filed on Jun. 19, 2007, now U.S. Pat. No. 7,804,830, the disclosure of which is herein incorporated by reference.

FIELD OF THE INVENTION

The present invention relates to Internet Protocol (IP) Network technology. More particularly, this invention relates to enabling service nodes, agents for those nodes or other nodes of a network to formulate direct IP connectivity to enable communication devices to establish unidirectional and bi-directional IP connectivity on an IP network, including, but not limited to the public Internet, taking into consideration that one or more of these devices may be located behind a Network Address Translator (NAT) device.

BACKGROUND

When establishing application IP connectivity directly between two devices on an IP network, it is usually achievable by directing IP packets from the source IP address of the sender to the IP address of the receiver and vice versa. However, with the growth of corporate and private local area networks (LANs), IP connectivity may be funneled via a common connection sharing device commonly know as a Network Address Translator (NAT). This device masks the originating address of one or many devices on one network so that they appear as one common address on another network. By way of example, connection from the public Internet to a device located on the private LAN is not possible until the device located on the private LAN has first opened a pathway ("pinhole") to it with the NAT device for which IP connectivity can be established. When using client-server applications such as web servers where the client behind NAT (CBN) is requesting service from a web site, the connection originates from the CBN and a pinhole is opened in the NAT device to facilitate IP connectivity.

Where peer type (exchange between equals neither a server or a client) communication devices require interconnectivity, these devices must first open pinholes from inside of the respective NAT devices to facilitate receiving communication. Not all NAT devices behave in a similar predictable manner; some can be easier to traverse, while others require a higher degree of complexity to establish direct IP connectivity. When the latter is the case, and both communication devices are clients behind NATs ("CBN"), the difficulty is multiplied.

Existing methodologies have included the provisioning of IP connectivity either manually or using some form of IP communication, to the NAT device to allow other communication devices to connect to the CBN (this is commonly known as port forwarding), provide tunneling facilities which will build a direct IP tunnel between the devices for connectivity to flow through (as an example, an IPSec tunnel) or having the communication devices contact an intermediate facilitating entity (node) that will assist by routing the IP connectivity through itself to enable connectivity between the devices. Intermediate facilitating entities may take the form of a specifically designed device, which will route the IP connectivity through (commonly known as a "media proxy" or simply "proxy"), or another like communication device, which acts as a go-between between two or more other communication devices (commonly known as peer to peer).

Other work in facilitating direct IP connectivity has primarily focused on the communication devices "learning" about the NAT devices they reside behind, and listing possible IP address and port candidates (or guesses) to facilitate direct IP connectivity. Candidates may be compiled from information provided in the signaling messages, as well as observed IP address and ports from which packets are transmitted. Each device then goes through a routine of hit and miss, trial and error until a successful pathway, if possible, is found. This routine may include trying different IP protocols, different IP addresses (for example, internal address, public IP address of the remote NAT device) or trying different port numbers.

In view of the above, it would be desirable if the communication devices were able to simply, successfully and efficiently establish IP connectivity directly between each other without routing pathways through intermediate facilitating entities, which may add additional cost to provisioning or operating of a service, and without requiring a hit and miss guessing type methodology which may result in failed connectivity.

DETAILED DESCRIPTION OF PREFERRED EMBODIMENTS

Figure 1:
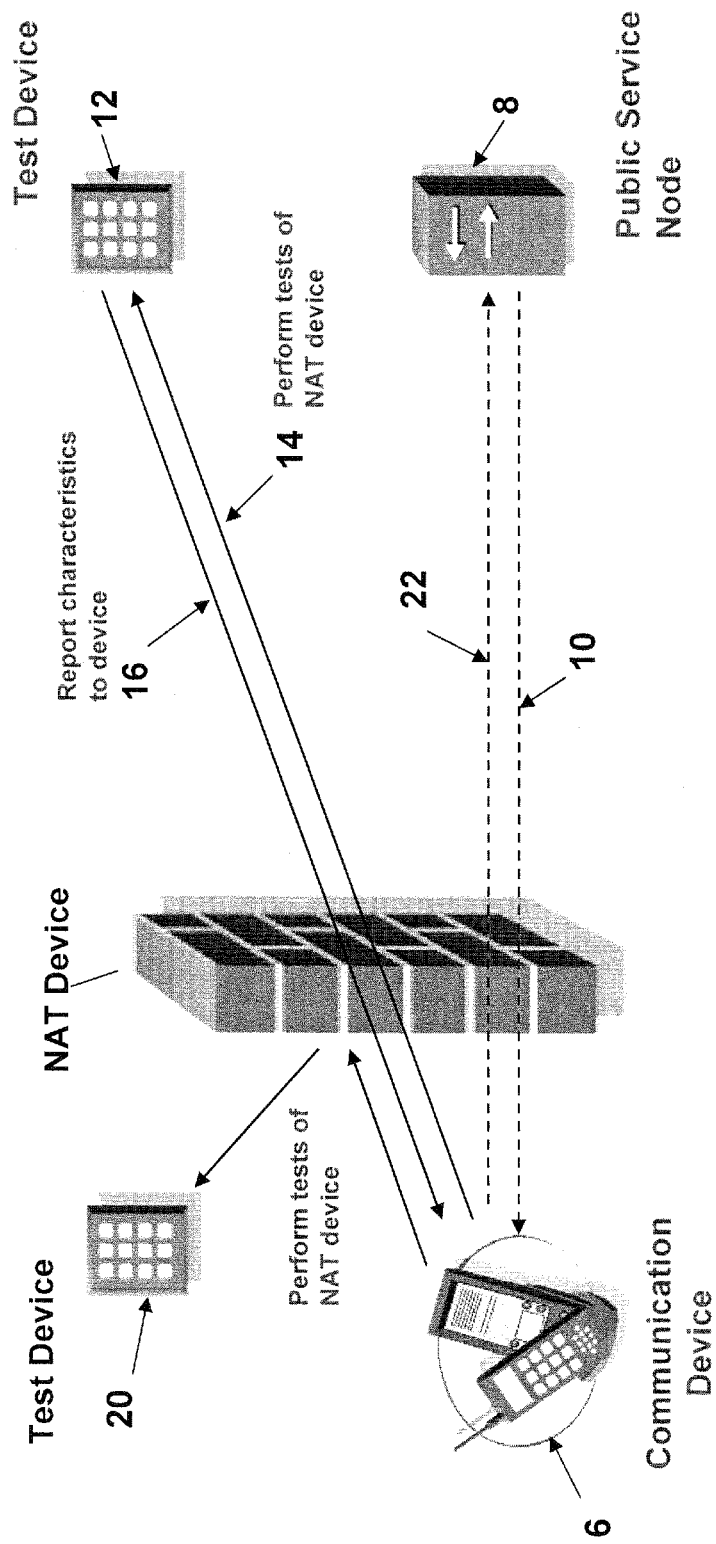
FIG. 1 is a simplified communication diagram of a portion of a network illustrating selected communications between a communication device behind a NAT device and a public service node.

In the following description, numerous specific details are set forth to provide a thorough understanding of the present invention. The present invention may be practiced, however, without some of or all of the specific details and some well-known process steps are omitted in order to not obscure the present invention.

In one embodiment, a communication device associated with a public service node, or an agent for that node, may be notified by that node/agent as possibly residing behind a NAT device. The service node or its agent provides instructions to the communication device to test the characteristics of the corresponding NAT device. The communication device executes the instructions specified by the service node/agent and performs the applicable tests. The results of the said tests may then be reported back to the service node or it's agent to be used for calculating future IP connectivity pathways.

When initiating connectivity to a remote communication device, either the local or remote service node or their agents, with information about the presence of a NAT device and the characteristics of that NAT device, collected by the responding communication device's service node or agent, may use this information to formulate using a prescribed procedure, a strategy to traverse any pertinent NATs and then instruct their applicable communication devices on how to establish direct IP connectivity. This may include, but is not limited to, instructing the applicable communication devices to open pinholes in their own NAT devices, behaving in a way to assist the remote communication device to open IP connective pathways to itself; or, as a last resort, furnishing instructions to route the IP connectivity locally or remotely through an assigned intermediate facilitating entity.

Set forth below is the apparatus and methodology enabling communication on an IP network, where at least one communication device residing behind a NAT device, can associate with a service node or via its agent, thereby provisioning that said service to the device, can then use that said node/agent and other elements forming part of that service to assist it to establish direct IP bi-directional or unidirectional connectivity with other communication devices, associated to that service, which may or may not reside behind a NAT device.

Various "services" or protocols are known for associating a communication device and a service node or their agents. The present invention can be used in connection with various such services. In each case, specific details will vary in accordance with the service nodes/agents in question, as will be apparent to those skilled in the art. Accordingly, such details are omitted from this discussion.

In accordance with the various embodiments of the invention, a communication device behind a NAT device associates with a service node (a server located on a network outside of a NAT designed to support communication services) or an agent of that service node (a device on a network outside of a NAT, on the same network as the communication device or on a different network that acts on behalf of a service node to support communication services to a communication device). That association may be formed in various ways, as is known to those skilled in the art, including but not limited to registration to a particular service or sending one time or periodic IP connectivity between the communication device and the service node/agent.

Various methods of NAT detection that may be employed by the service node/agent are known to those skilled in the art, so they are not repeated here. For example, one common practice calls for including a source IP address in the transmitted message and comparing that address with the detected source address of the IP packet. If the detected address differs from the enclosed address in the message, then it maybe assumed there is some form of NAT device being employed. Other common practices include the communication devices employs NAT device detection routines outside the instruction of the service or have another device test the NAT device on behalf of the communication device.

Figure 2:
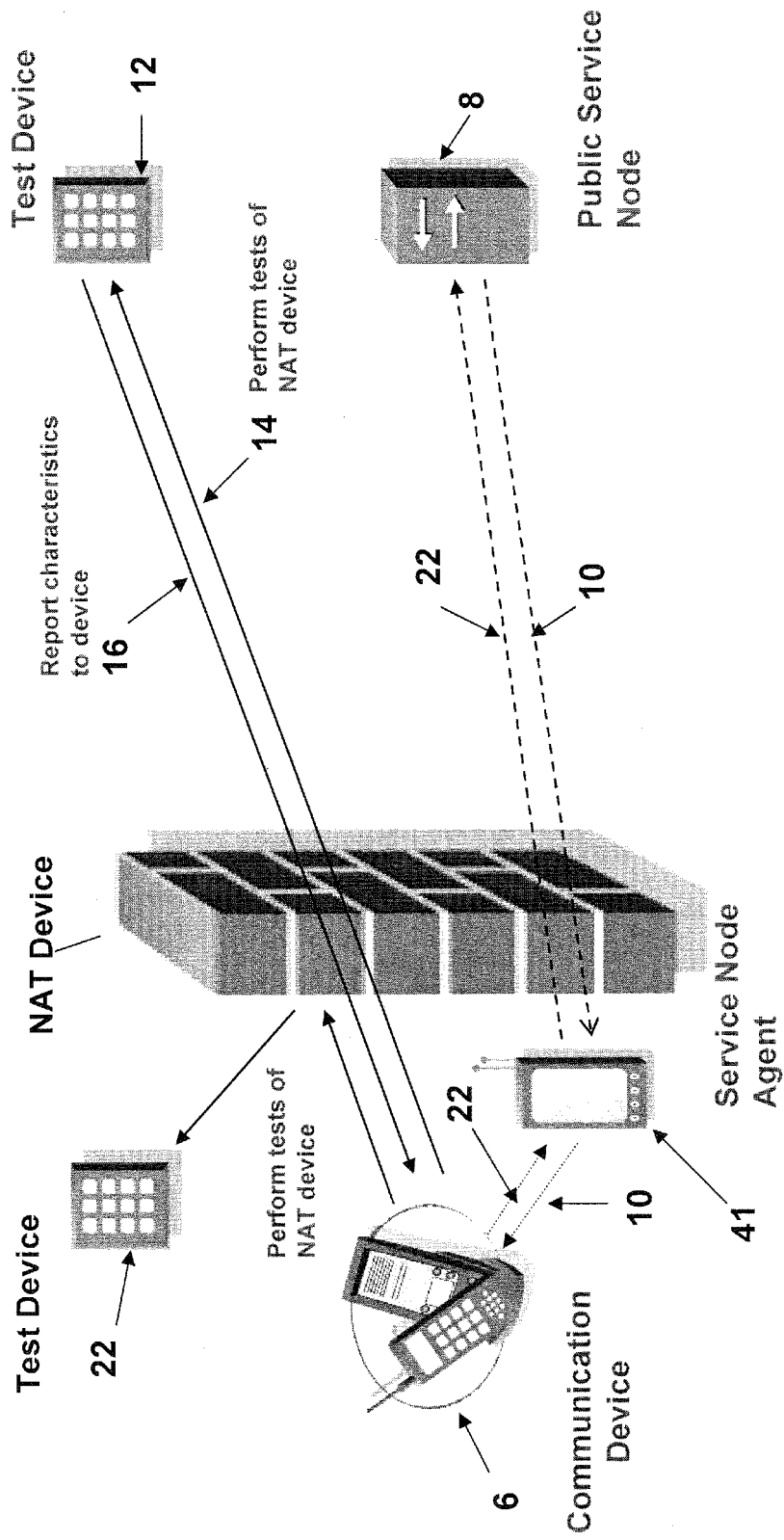
FIG. 2 is a simplified communication diagram that demonstrates the addition of a service node agent to FIG. 1

If a NAT is detected or suspected of being present by the service node or its agent, then in one embodiment, the node/agent furnishes instructions to the corresponding communication device to test the presence of a corresponding NAT device and the characteristics of that device to facilitate the provision of that service to the communication device. For example, the service node or its agent may include first programming code for directing the communication device to test the NAT. FIG. 1 in the drawing illustrates a portion of a network, in which a communication device 6, on the left, resides behind a NAT device. In this example, a public service node 8 has detected or suspects the presence of the NAT device. By executing the first code, the service node sends instructions via a message 10 to the communication device 6 for testing for a NAT device and determine characteristics of that device for provision of service. The communication device 6 follows the instructions to test the presence of a NAT device and the characteristics of that device it may reside behind, provided by the service node, with respect to the provisioning of the service. FIG. 2 illustrates how a service node agent 41 performs the services of a public service node described in FIG. 1.

Specific details of the methods by which a communication device detects the presence of a NAT device and the characteristics of that device it resides behind, and what pertinent information is required about that device, are dependent on the communication system employed and should be consistent with common practices of determination and reporting. For example, if using the UDP transport protocol, utilizing a STUN server; or, in the case of TCP transport protocol, utilizing a STUNT server.

Referring again to FIG. 1, it shows the communication device 6 performing specified tests by communicating with a remote test device 12, via path 14. The test device 12 reports NAT characteristics back to the communication device 6 via path 16. Similarly, the device 6 may perform tests using a second test device 20, which in this example is behind the same NAT device.

Upon completion of the NAT device tests, either under instruction of the service node/agent, by another device or on its own initiative, the communication device 6 reports its findings back to the service node 8, via message 22. In an embodiment, the service node may execute second code for receiving the findings. These findings preferably are stored in the service node, its agent, or in another node (see FIG. 3), as part of the information for that communication device, which are to be utilized when formulating how to initiate/invite direct IP connectivity to that device. Again referring to FIG. 2 a service node agent 41 may be the recipient of the NAT characteristics information via path 22, which may then store or forward that information to the service node 8.

In general, for the purpose of initiating or inviting IP connectivity to a device residing behind a NAT device, a permanent/semi-permanent/periodic IP connectivity is required and maintained, through the NAT device, between the communication device and the associated service node either directly or through its agent. The particular method or apparatus for maintaining this connectivity is service dependent. For example, in an H.323 VoIP system, an H.460.17 or 18 connection maybe maintained; or, for a SIP VoIP system, short registration intervals maybe employed to keep a connection pathway open between the communication device (User Agent) and the service node (SIP Server). These examples are merely illustrative.

Figure 3:
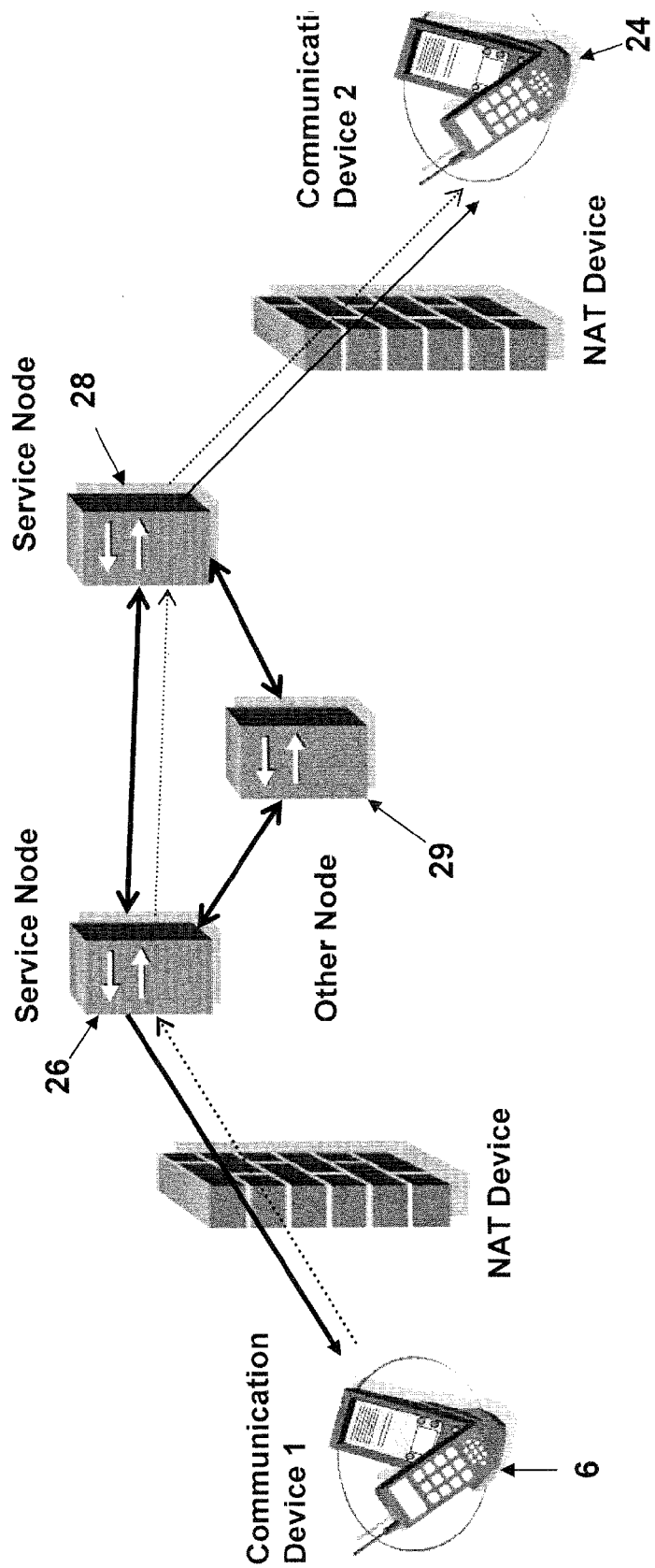
FIG. 3 is a simplified communication diagram of a portion of a network illustrating a method for formulating direct IP connectivity between communication devices each behind a respective NAT.

Referring now to FIG. 3, when attempting to initiate IP connectivity to another communication device, the communication device 6 behind a NAT device forwards information on the target communication device 24 to it's service node 26 or its agent 41 (refer FIG. 4), and the service node/agent may transmit the pertinent NAT information to the target communication device's service node 28, its agent 42 (refer FIG. 4) or requests that said node/agent supply the pertinent information to it or both, or have the information collected by another node 29. In other words, the service nodes 26, 28 or their agents 41,42 (FIG. 4) may exchange information including pertinent NAT device characteristics, optionally including another node 29. Thus the service node may execute third code for directing a second communication device to test a second NAT device that it resides behind so as to determine selected characteristics of the second NAT device; and the service node may further execute fourth code for receiving from the second communication device indicia of the selected characteristics of the second NAT device and storing the received indicia of the selected characteristics of the second NAT device. This information should be collected in at least one of these nodes or agents for the purpose of calculating direct IP connective pathways between the communication devices.

Specific details of the communication or exchange of NAT traversal configuration instructions between the various elements of the communication system may vary, depending on the service mechanism employed. For example, in an H.323 system an H.460 generic feature or for a SIP system a header extension maybe employed. The decision on how the pertinent NAT information is to be exchanged and collected also varies as a function of the specific communication system. Eg: For a H.323 VoIP system, the pertinent NAT information collection maybe conducted by the initiating service node (for example a gatekeeper) and requested from the remote service node, where as a SIP VoIP system might forward the NAT information on to the respondents service node (for example a SIP Server) as a collection point for the information. Other systems may choose to collect the information in a service node agent or another node in the service. These implementation details will be apparent to those skilled in the art of IP networking technology in view of the present specification.

Upon the collection of pertinent NAT information of the communication devices by a service node, its agent or another node, a logical progression of steps involving the comparison of those said NAT device characteristics is to be used to determine a direct IP connective pathway. To that end, the service node may execute fifth code for defining at least one IP connectivity pathway for direct IP communication between the first and second communication devices based on the stored indicia of the selected characteristics of the first and second NAT devices. Such a process is illustrated by the following example, illustrating how a direct IP connective pathway may be formulated for UDP protocol connectivity. This example takes into account that the service nodes can provide Intermediate IP facilitation (proxy).

TABLE 1

NAT Device Characteristics (as defined in STUN RFC3489)

| Value | NAT Type |
|---|---|
| 1 | No NAT device |
| 2 | Cone NAT device |
| 3 | Symmetric NAT device |

TABLE 2

Proposed strategy

| Value | Strategy |
|---|---|
| A | No Assistance |
| B | Device 1 invites connectivity* |
| C | Device 2 invites connectivity* |
| D | Device 1 service node facilitation# |
| E | Device 2 service node facilitation# |

*Communication device nominated whether behind a NAT device or not requires configuration in order to establish direct IP connectivity.
Strategy is not classed as direct IP connectivity.

TABLE 3

Calculated direct IP connective Pathways

| Device 1 NAT | Device 2 NAT | Strategy |
|---|---|---|
| 1 | 1 | A |
| 1 | 2 | B |
| 1 | 3 | B |
| 2 | 1 | C |
| 2 | 2 | B or C* |
| 2 | 3 | B |
| 3 | 1 | C |
| 3 | 2 | C |
| 3 | 3 | D or E* |

*Selection of method to use may vary from system to system

For direct IP connectivity to be established to or from a communication device behind a NAT device, either the communication device requires special per-connection configuration, or the responding communication device requires some form of configuration in order to establish connectivity. The service node, its agent, or other node performing direct IP connective pathway calculations forwards this information to the communication devices, typically via each communication device's associated service node/agent, or through another channel, for the purpose of instructing how that said communication device is to self configure to initiate or invite direct IP connectivity. In this regard, the service node may execute sixth code for instructing each of the first communication device and the second communication device on how to self-configure themselves to support the defined IP connectivity pathway.

Figure 5:
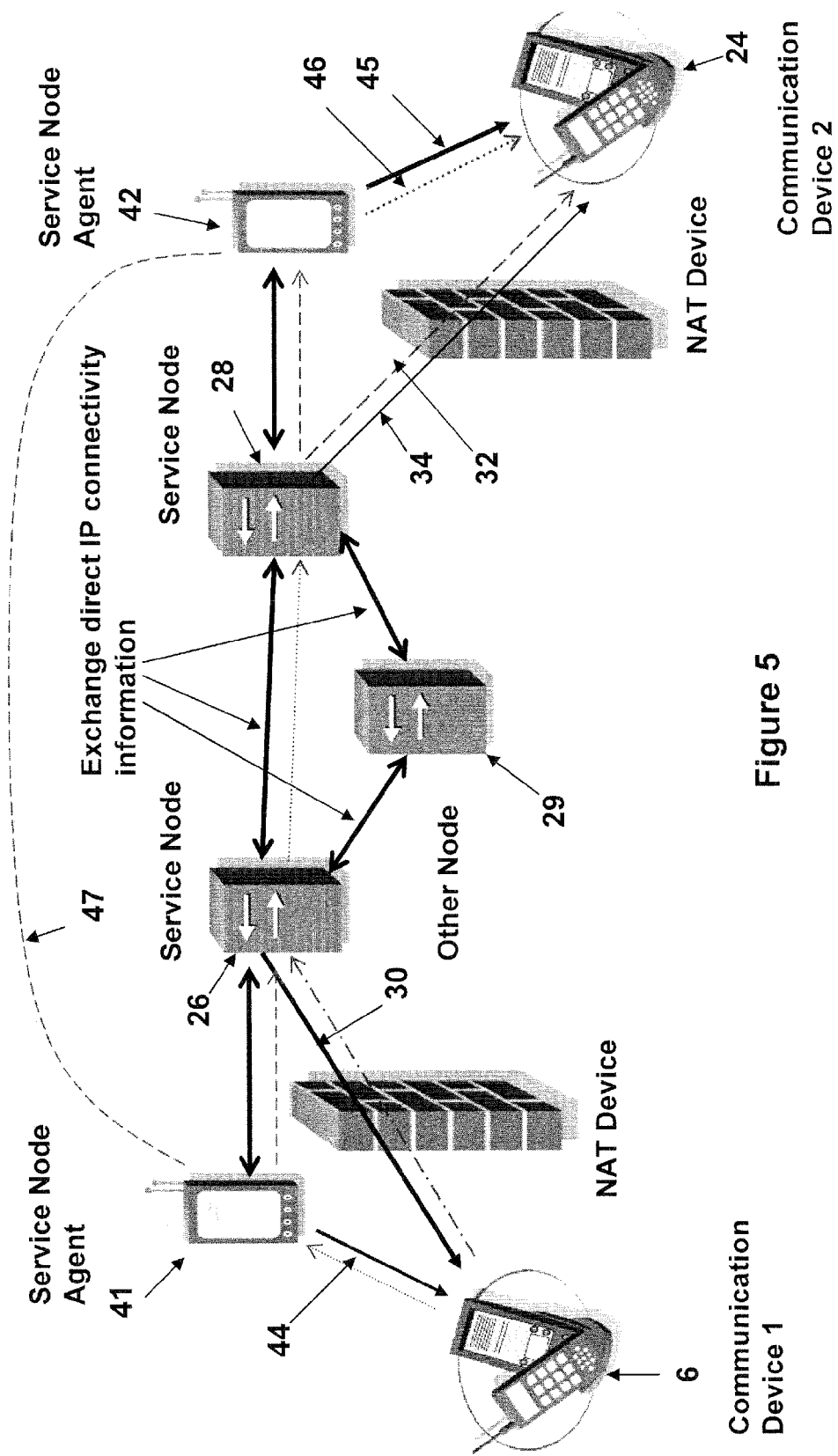
FIG. 5 is a simplified communication diagram of a portion of a network illustrating a method for configuring communication devices to realize direct IP connectivity where the communication devices each reside behind a respective NAT.
Figure 6:
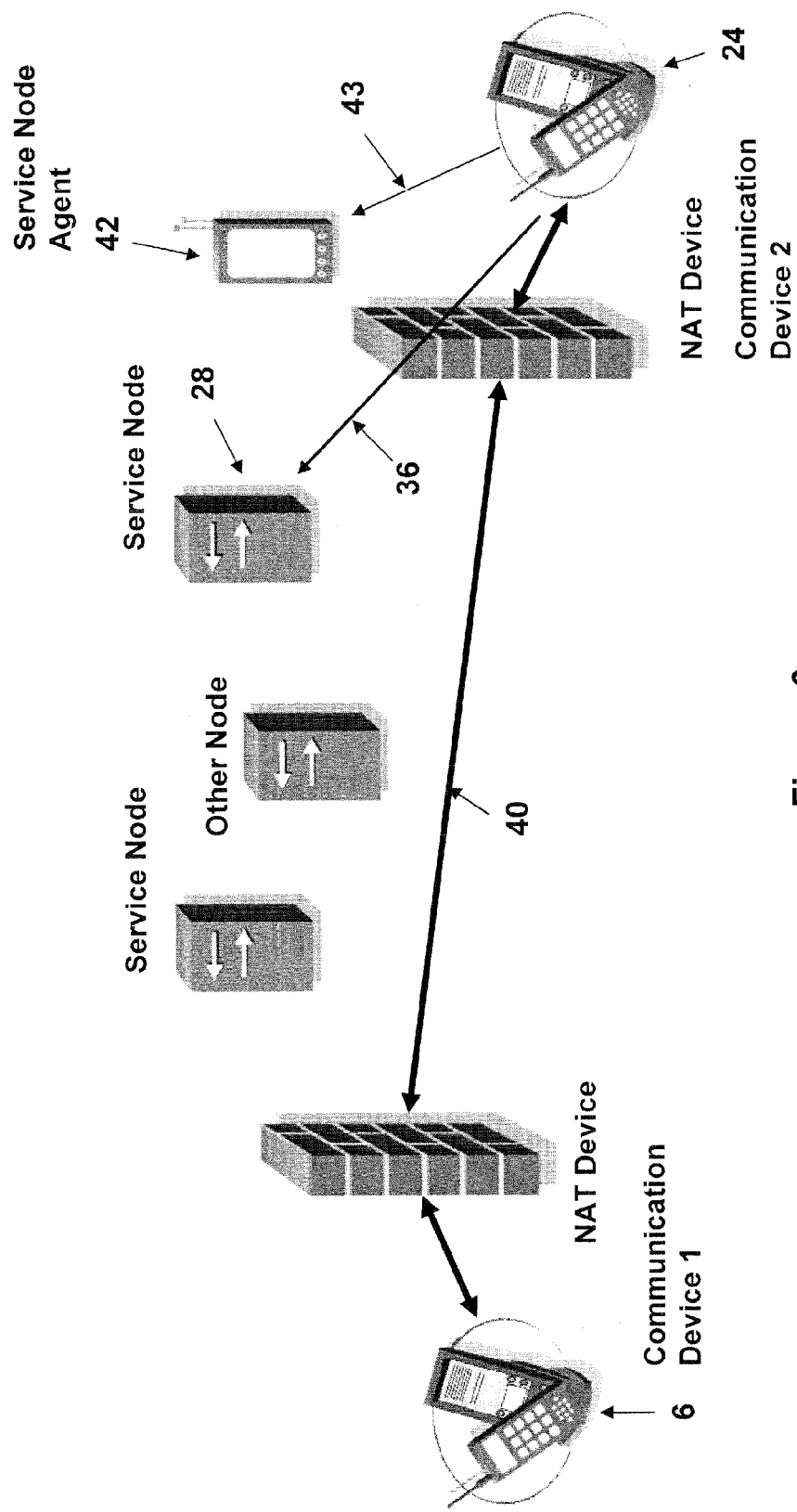
FIG. 6 is a simplified communication diagram of a portion of a network illustrating a realization of direct IP connectivity where the communication devices each reside behind a respective NAT.

Referring now to FIG. 5, it illustrates the associated service node 26 sending instructions to communication device 6, via message or path 30, to configure itself for direct IP connectivity as determined above. Another service node 28 instructs the second communication device 24, via path or message 34, to configure itself for direct IP connectivity as determined above. Alternatively, the first device 6 may instruct the second communication device 24, via path or message 32, to configure itself for direct IP connectivity.

Where upon service node agents are used, the communications device 6, may receive its instructions from the service node agent 41 via path or message 44 Another agent 42 instructs the second communication device 24, via path or message 34. Alternately the first device 6 may instruct the second communication device 24, via path or message 46. Also the agents 41 and 42 may chose to bypass the service nodes and exchange instructions directly via path or message 47.

Specific details as to how the direct pathway information is transmitted to the communication device(s) may vary from network to network. For instance, in a SIP VoIP system, the information may be sent only to the recipient as the initiator may already be configured; whereas, in a H.323 VoIP system, the information may only be sent to the initiator of the connection and the initiator forwards it to the responding communication device during the connection initiation. Implementation details for any given network or system will be apparent to those skilled in the art in view of the present general disclosure. Upon the communication devices receiving the direct pathway instructions, the devices configure themselves in accordance with those instructions.

As an example, a communication device behind a NAT device may be instructed that strategy B in table 1 is to be employed for direct IP connectivity, and as being Device 1 in that said calculation, it's role is to invite IP connectivity. (Device 2 will be the initiator). To do so, it may use a common mechanism to open a port (pinhole) in its NAT device and listen on that opened port. It then notifies the initiator by some system dependent means to use the public IP address and the just opened port to initiate IP connectivity. Once the devices have self-configured according to a common instruction, direct IP connectivity can be established between the communication devices.

Figure 4:
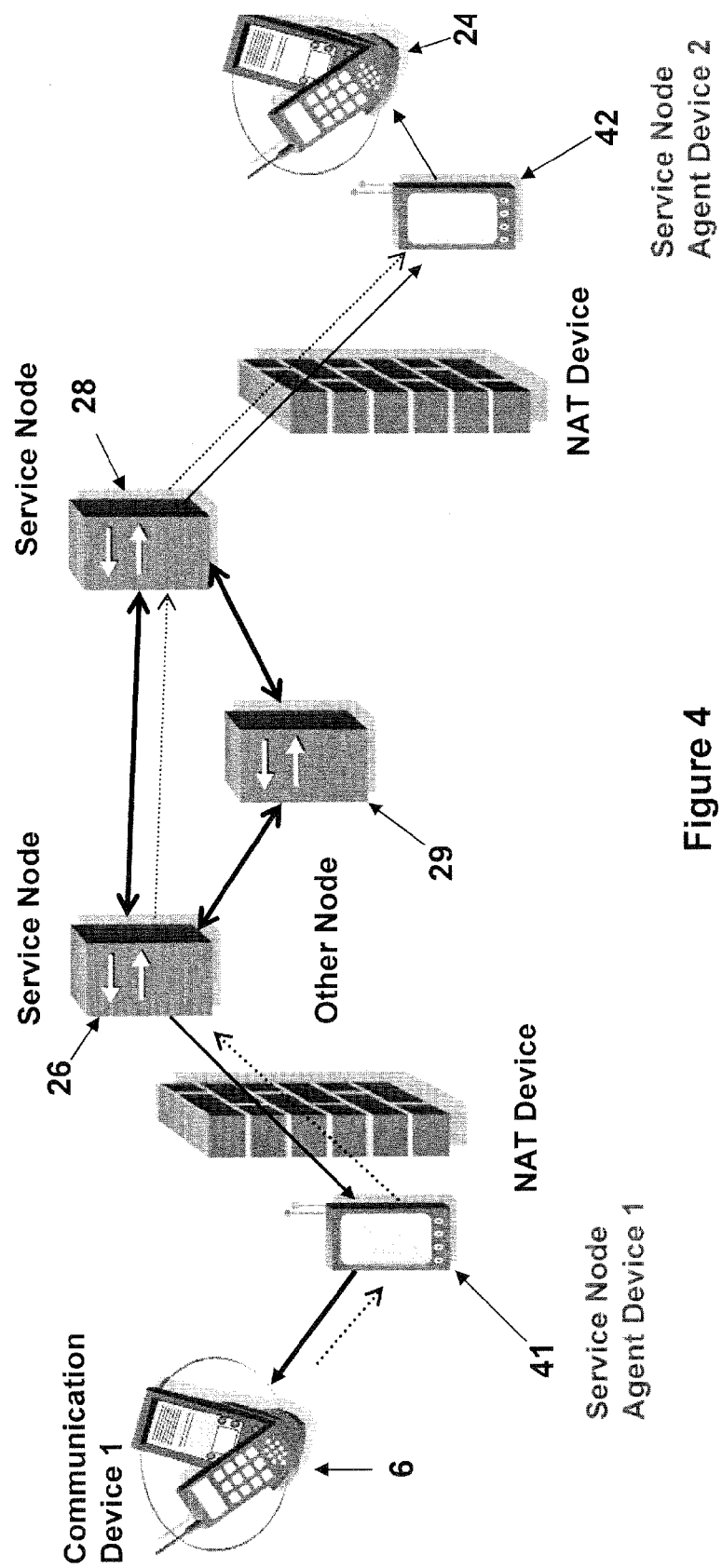
FIG. 4 is a simplified communication diagram that demonstrates the addition of a service node agents to FIG. 3

This can be achieved in the example above, by Device 2 initiating IP connectivity, it sends an IP packet which automatically opens a port (pinhole) in its own NAT device and when that IP packet successfully reaches Device 1, Device 1 may use the detected IP source address and port of that said IP packet (being the IP address and port of the NAT device) to establish a destination target to successfully communicate with Device 2. Device 1 may not send another IP packet, and only a uni-directional IP conductive pathway ensues, or it may continue to send IP packets to establish bi-directional connectivity on the same IP connective pathway. Many such IP connective pathways may be established between the communication devices to facilitate different types of services. These may either occur during IP connectivity initiating or after initial direct IP connectivity has been established between the said devices. FIG. 4 illustrates the communication devices 6, 24 having configured themselves for direct IP connectivity. This also shows the device 24 instructing its associated service node 28, via path 36, to configure itself for direct IP connectivity. Finally, the configured direct IP connection is invited or initiated between the communication devices 6, 24 and realized as connection 40, successfully traversing the NAT devices.

Where upon the special case where the communication devices are determined to reside behind the same NAT device, direct IP connectivity between the communication devices cannot be easily determined (as the design of the network behind the NAT device does not form a component of the calculation of direct IP connective pathways) the communication devices, having been advised of such a case, shall attempt to establish direct IP connectivity between each other themselves. The service node may initially provide intermediate facilitating entity (proxy) support until the communication devices have successfully establish direct IP connectivity between each other.

It will be obvious to those having skill in the art that many changes may be made to the details of the above-described embodiments without departing from the underlying principles of the invention. The scope of the present invention should, therefore, be determined only by the following claims.

The invention claimed is:

1. An IP network service node comprising:
a digital processor; and
non-transitory, machine-readable storage media storing a series of instructions comprising programming code that is executable on the digital processor for supporting direct peer-to-peer media flows, the programming code including:
first code for directing a remote communications device that resides behind an NAT device to perform a test of the NAT device so as to determine a selected characteristic of the NAT device;
second code for receiving from the first communication device indicia of the selected characteristics of the corresponding NAT device and storing the received indicia of the selected characteristics of the corresponding NAT device;
third code for directing a second communication device to test a second NAT device that it resides behind so as to determine selected characteristics of the second NAT device;
fourth code for receiving from the second communication device indicia of the selected characteristics of the second NAT device and storing the received indicia of the selected characteristics of the second NAT device;
fifth code for defining at least one IP connectivity pathway for direct IP communication between the first and second communication devices based on the stored indicia of the selected characteristics of the first and second NAT devices; and
sixth code for instructing each of the first communication device and the second communication device on how to self-configure themselves to support the defined IP connectivity pathway.

2. The IP network service node of claim 1 wherein instructing the communication devices on how to self-configure themselves to support the defined IP connectivity pathway comprises transmitting the configuration in a packet header extension.

3. The IP network service node of claim 1 wherein the selected characteristics identify each NAT device as one of—1) no NAT device, 2) Cone NAT device, and 3) Symmetric NAT device.

4. The IP network service node of claim 3 wherein defining the IP connectivity pathway for direct IP communication includes comparing the NAT device characteristics and based on the comparison, selecting a strategy among a set of strategies that includes—A) no assistance, B) the first communication device invites connectivity, and C) the second communication device invites connectivity.

5. The IP network service node of claim 4 including selecting the strategy according to the following table:

| First Communication Device NAT | Second Communication Device NAT | Strategy |
| --- | --- | --- |
| 1 | 1 | A |
| 1 | 2 | B |
| 1 | 3 | B |
| 2 | 1 | C |

6. The IP network service node of claim 1 wherein instructing the first communication device comprises instructing the device to execute at least one of—
(a) open a port in the NAT using a third party device,
(b) listen for a first packet from a remote device to determine target to send media, and
(c) send media to the remote target communication device to realize direct IP connectivity between the communication devices.

7. The IP network service node of claim 1 wherein instructing the target communication device comprises instructing the device to execute at least one of—
(a) open a port in the NAT using a third party device,
(b) listen for a first packet from the first device to determine destination to send media, and
(c) send media to the first communication device to realize direct IP connectivity between the communication devices.

* * * * *